United States Patent
Allen

(10) Patent No.: US 9,507,621 B1
(45) Date of Patent: Nov. 29, 2016

(54) SIGNATURE-BASED DETECTION OF KERNEL DATA STRUCTURE MODIFICATION

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/469,151

(22) Filed: Aug. 26, 2014

(51) Int. Cl.
*G06F 9/455* (2006.01)

(52) U.S. Cl.
CPC . *G06F 9/45558* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 6,167,425 A * | 12/2000 | Beckhoff | G06F 9/4887 703/26 |
| 7,373,520 B1 * | 5/2008 | Borthakur | G06F 17/30097 705/51 |
| 7,904,278 B2 | 3/2011 | Wilson et al. | |
| 8,327,059 B2 | 12/2012 | Chen et al. | |
| 8,583,891 B1 | 11/2013 | Spangler et al. | |
| 8,645,950 B2 | 2/2014 | Fries et al. | |
| 8,745,308 B2 | 6/2014 | Chen et al. | |
| 8,949,797 B2 | 2/2015 | Aaraj et al. | |
| 8,950,007 B1 | 2/2015 | Teal et al. | |
| 2004/0117620 A1 * | 6/2004 | Rothrock | G06F 21/14 713/164 |
| 2005/0005101 A1 * | 1/2005 | Yenduri | G06F 21/57 713/164 |
| 2005/0091365 A1 * | 4/2005 | Lowell | G06F 9/45533 709/224 |
| 2005/0223362 A1 | 10/2005 | Whitlock et al. | |
| 2006/0015732 A1 | 1/2006 | Liu | |
| 2006/0242406 A1 * | 10/2006 | Barde | G06F 21/10 713/164 |
| 2008/0320594 A1 | 12/2008 | Jiang | |
| 2009/0006862 A1 * | 1/2009 | Alkove | G06F 21/10 713/189 |
| 2010/0223613 A1 | 9/2010 | Schneider | |
| 2010/0325628 A1 | 12/2010 | Haga et al. | |
| 2011/0047621 A1 * | 2/2011 | Brando | G06F 8/61 726/24 |
| 2011/0283358 A1 | 11/2011 | Cochin et al. | |
| 2011/0321166 A1 * | 12/2011 | Capalik | H04L 63/1491 726/25 |
| 2012/0011501 A1 * | 1/2012 | Filali-Adib | G06F 9/45558 718/1 |
| 2012/0311341 A1 * | 12/2012 | Paris | G06F 21/57 713/179 |
| 2013/0047150 A1 * | 2/2013 | Malasky | G06F 9/44547 717/176 |
| 2014/0215461 A1 | 7/2014 | Laor et al. | |
| 2014/0298338 A1 | 10/2014 | Doi | |
| 2014/0372717 A1 | 12/2014 | Ciu et al. | |

OTHER PUBLICATIONS

Carbone et al., "Mapping Kernel Objects to Enable Systematic Integrity Checking," Proceedings of the 16th ACM Conference on Computer and Communications Security, Nov. 9-13, Chicago, Illinois, 11 pages.

* cited by examiner

*Primary Examiner* — Emerson Puente
*Assistant Examiner* — Charlie Sun
(74) *Attorney, Agent, or Firm* — Davis Wright Tremaine LLP

(57) ABSTRACT

A method and apparatus for signature-based detection of kernel data structure modification are disclosed. In the method and apparatus a signature is generated for a kernel data structure, whereby the kernel data structure is capable of being modified based at least in part on access to the kernel data structure. The signature is also updated as a result of access to the kernel data structure due at least in part to one or more identified instructions being executed. The signature is used to determine whether the kernel data structure is accessed by one or more other instructions.

22 Claims, 8 Drawing Sheets

SIGNATURE-BASED DETECTION OF KERNEL DATA STRUCTURE MODIFICATION

CROSS-REFERENCE TO RELATED APPLICATIONS

This application incorporates by reference for all purposes the full disclosure of: co-pending U.S. patent application Ser. No. 14/469,390, filed concurrently herewith, entitled "IDENTIFYING KERNEL DATA STRUCTURES", co-pending U.S. patent application Ser. No. 14/469,200, filed concurrently herewith, entitled "IDENTIFYING TAMPER-RESISTANT CHARACTERISTICS FOR KERNEL DATA STRUCTURES" and co-pending U.S. patent application Ser. No. 14/468,943, filed concurrently herewith, entitled "SCANNING KERNEL DATA STRUCTURE CHARACTERISTICS".

BACKGROUND

Computer systems are often subject to attacks that attempt to control the operation of the computer systems and cause them to operate in a manner dictated by an attacker. One area of interest for attackers is the operating system kernel. The operating system kernel has a direct and substantial influence over the operation of the computer system and associated operating system and operating system-based executable applications. Further, because, in a hierarchal sense, the kernel space is below that of operating system applications, attacks on the kernel may be difficult to detect or deter by applications that run on the computer system.

It is, therefore, often challenging to detect or deter attacks on a kernel of a computer system. It is also challenging to detect or deter attacks on a kernel of a computer system without interrupting legitimate operations of the computer system.

BRIEF DESCRIPTION OF THE DRAWINGS

Various embodiments in accordance with the present disclosure will be described with reference to the drawings, in which.

DETAILED DESCRIPTION

Figure 1:
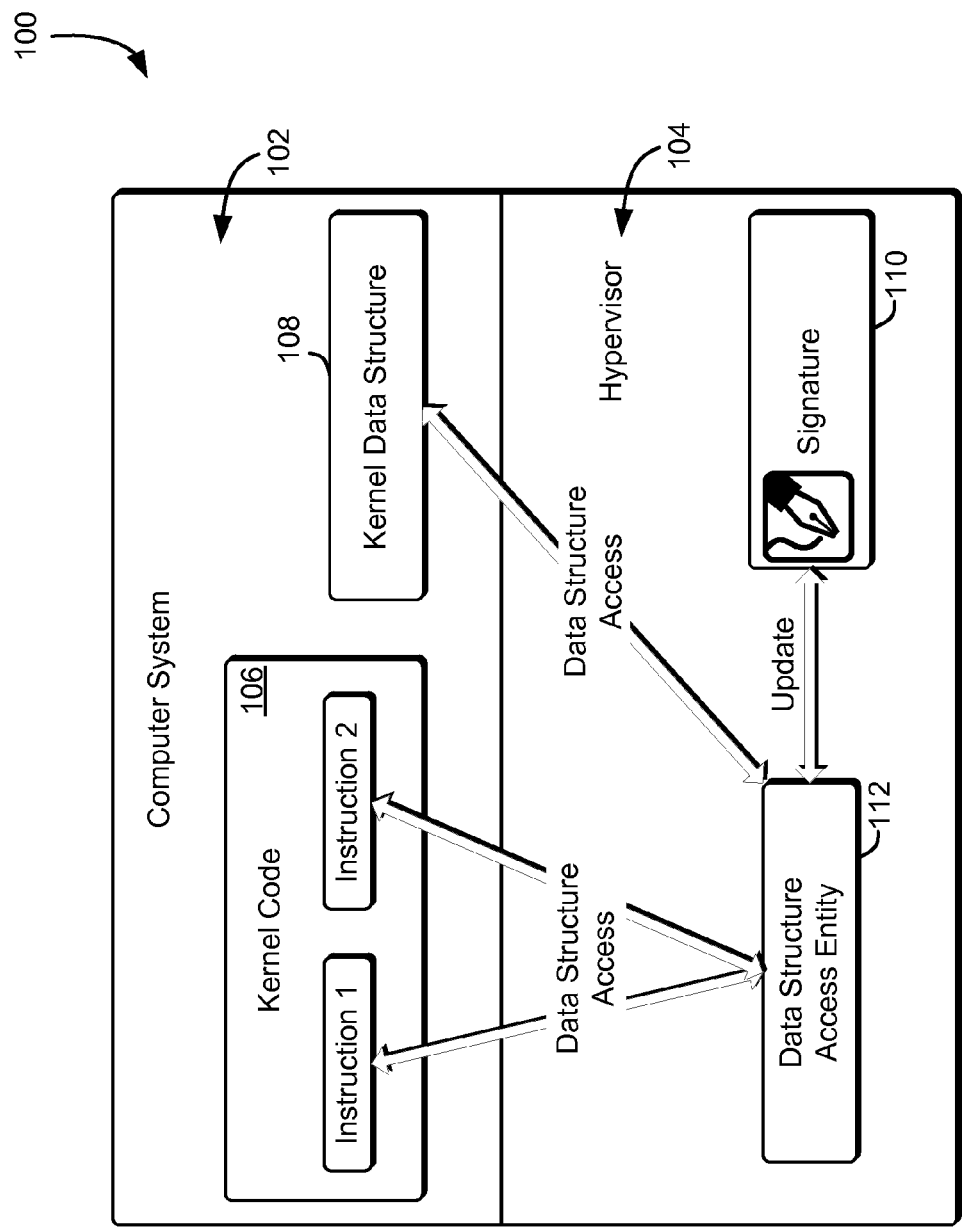
FIG. 1 shows an example of an environment for signature-based detection of kernel data structure modification in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include detecting and deterring attacks on an operating system kernel of a computer system. A computer system as described herein may be a computer, server or a host, among others. The computer system may be a virtual computer system, whereby as a virtual computer system, the computer system may be instantiated using underlying computing resources provided by a host computer system. The computer system may be launched and configured for service by, for example, presenting an operating system, computing functionality using a central processing unit (CPU) or other processing device or communications functionality using a communications device, such as a modem, among others. Following launching the computer system, the computer system may be suspended by a process of termination or "tearing down," whereby the computer system may be no longer be usable to perform computing functions.

A computer system may have an associated operating system. The operating system may be a program, process or module, among others, that manages computing resources (such as computational resources provided by a CPU or a graphics processing unit (GPU), among others, storage resources, such as static or dynamic memory, or communications resources, among others). Further, the operating system may offer a standardized platform upon which applications may be executed on the computer system. The operating system of the computer system may have an associated kernel. The kernel provides the operating system with control over the computing resources of the computer system. The kernel may be configured to manage memory access for applications. Further, the kernel may configure operating states of the operating system and organize data for storage in the memory of the computer system.

The kernel of the operating system may have one or more associated kernel data structures. A kernel data structure may be a data object comprising one or more bits, whereby the kernel data structure may influence or affect the operation of the kernel or the operating system. For example, the kernel data structure may include information about a running state of the computer system and may be modified to reflect the state the operating system. If an application is launched on the computer system, the kernel data structure may be created to represent the new process or link the kernel data structure to other kernel data structures in the computer system. Further, the kernel data structure may include pointers to memory addresses, memory addresses of other kernel data structures or memory addresses of routines. The data kernel structure may be stored in physical memory and may be intended to be accessible only by the kernel or associated subsystems.

The kernel data structure may be modifiable in accordance with the operation of the computer system. For example, the kernel data structure may accept a wide range of values depending on the operational state of the computer system. Modification of the kernel data structure (for example, as made by an attacker) may cause the computer system to function in a pre-determined manner sought or established by the attacker. Further, modification of the kernel data structure may result in some circumstances in the attacker assuming control of the computer system.

To detect a potential attack on the kernel data structure (for example, made by an attempt to change the kernel data structure), a signature of the kernel data structure may be generated and stored. The signature may be a copy of the kernel data structure or an outcome of a function applied to the kernel data structure. For example, the signature may be the output of a hash function applied to the kernel data structure or a parity bit of the kernel data structure. Following the generation of the signature, all access to the kernel data structure may be required to be performed in a manner such that the signature is updated in accordance with the access. For example, if the access results in changing or overwriting the kernel data structure, the signature may be updated correspondingly to reflect the change to the kernel data structure. By requiring that the signature is updated in accordance with the access, the signature may be used to determine whether unidentified access to the kernel data structure has been performed.

Before providing the computer system for service or at any other point in time, the kernel data structures of the computer system may be identified. Further, instructions that, when executed, access the kernel data structure may also be identified. The instructions may be part of the kernel code and may be identified based at least in part on static or dynamic analysis of the kernel code. Static analysis may be performed outside of a run-time environment or without executing the kernel code. Static analysis may permit identifying interactions between code and data and tracing the flow of data due to instructions being called or invoked between various vertices or points. Dynamic analysis may be used to examine the kernel code in a running environment and identify properties of the kernel code. For example, dynamic analysis may be used to identify instructions whose execution affects a kernel data structure. Further, the instructions may be identified based at least in part on a reachability graph that is constructed as described in co-pending U.S. patent application Ser. No. 14/469,390 entitled "IDENTIFYING KERNEL DATA STRUCTURES" and co-pending U.S. patent application Ser. No. 14/469,200 entitled "IDENTIFYING TAMPER-RESISTANT CHARACTERISTICS FOR KERNEL DATA STRUCTURES", which are incorporated by reference herein. It may be assumed that illegitimate access to the kernel data structure may be sought to be performed by an attacker after placing the computer system into service. Accordingly, the illegitimate access may be performed using instructions that are not part of those identified using the reachability graph.

To identify whether an attempt to change the kernel data structure is potentially being made, the signature may be used to determine whether the kernel data structure has been modified at any point in time. Because changes to the kernel data structure due at least in part to the execution of the one or more identified instructions are reflected by the signature, changes made due at least in part to the execution of other instructions will result in an algorithmic relationship between the kernel data structure and the signature being changed. One or more invariant conditions may be placed on the retained signature and the kernel data structure. The one or more invariant conditions may be violated due to the execution of the other instructions. Violation of the invariant conditions, if detected, is indicative of access to the kernel data structure due at least in part to the execution of the unidentified instructions. The violation of the invariant conditions may be used as an alarm or signal of a possible change to the kernel data structure, for example, because of an attack. Further, violation of the invariant conditions may be a false positive, for example, in the case that the change to the kernel data structure is legitimately made through invocation of the kernel code, whereby the kernel code in question was not identified as accessing the kernel data structure by the reachability graph analysis.

FIG. 1 shows an example of an environment for signature-based detection of kernel data structure modification in accordance with at least one embodiment. In the environment 100, a computer system 102 is instantiated using a hypervisor 104 as described herein. The computer system 102 has kernel code 106 that comprises one or more instructions (denoted as instruction 1 and instruction 2 in FIG. 1). During the course of operation of the computer system 102, the kernel code 106, when executed, accesses a kernel data structure 108 of the computer system 102. Accessing the kernel data structure 108 may include reading the kernel data structure 108 or writing to the kernel data structure 108, whereby the kernel data structure 108 may be modified. The hypervisor 104 may retain a signature 110 for the kernel data structure 108. Although, the signature is shown as being retained in hypervisor 104 space, it is recognized that the signature 110 may be retained outside of the hypervisor 104. The signature 110 corresponds to the kernel data structure 108 and may be updated or changed based at least in part on changes that are made to the kernel data structure 108.

A data structure access entity 112 is provided. The data structure access entity 112 may be a computer system program, process or module, among others, and may be tasked with updating the signature 110 based at least in part on changes to the kernel data structure 108. Although the data structure access entity 112 is shown as being part of the hypervisor 104 space, it is recognized that the data structure access entity 112 may be executed elsewhere within or outside of the computer system 102. Access by the kernel code 106 to the kernel data structure 108 may be performed by the data structure access entity 112 such that an up-to-date signature 110 is maintained for the kernel data structure 108. Furthermore, the data structure access entity 112 or another entity may be configured to provide an indication or a signal when one or more invariant conditions of the kernel data structure 108 and the signature 110 are violated as described herein.

Figure 2:
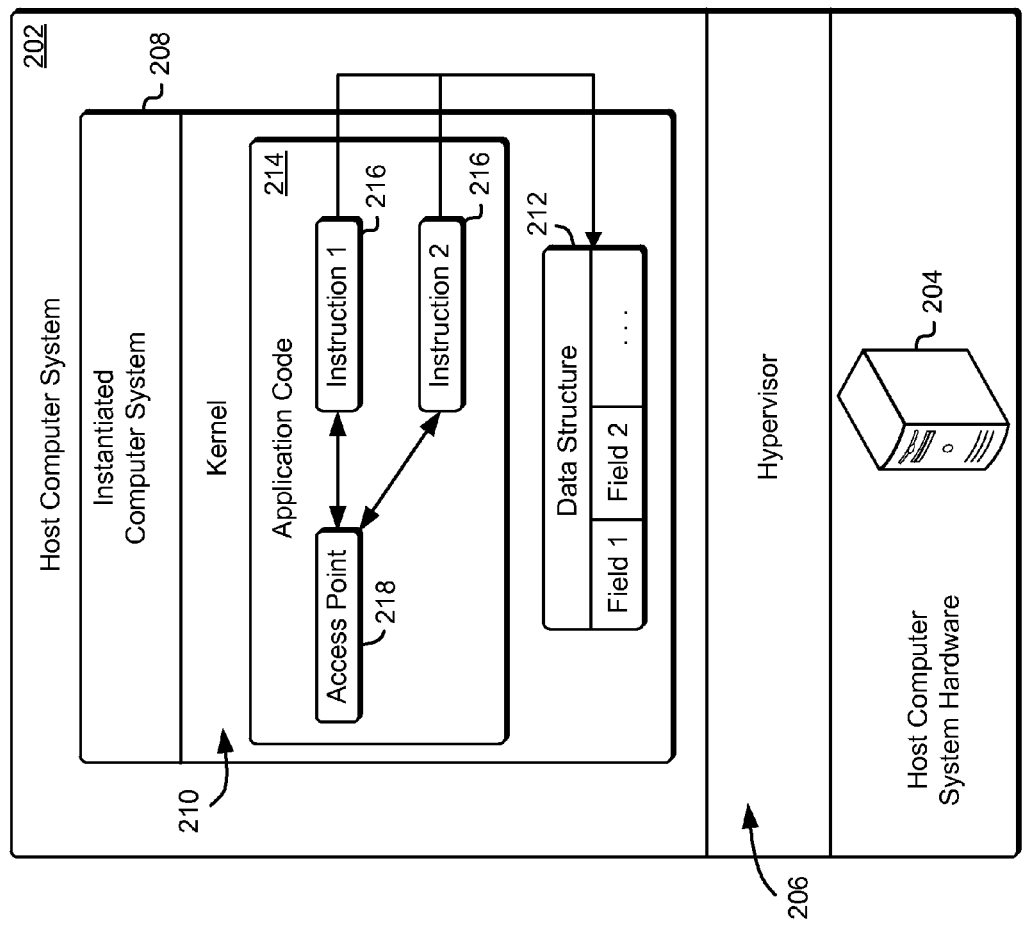
FIG. 2 shows an example of a host computer system having an instantiated computer system in accordance with at least one embodiment.

FIG. 2 shows an example of a host computer system having an instantiated computer system in accordance with at least one embodiment. The host computer system 202 may be a computer, server or host, among others and has underlying host computer system hardware 204. The host computer system 202 may be equipped with a processor, such as a central processing unit (CPU) or a graphics processing unit (GPU), that enables providing computational functionality. Examples of a CPU include those utilizing a complex instruction set computing (CISC) architecture, such as the x86 CPU, and others that utilize a reduced instruction set computing (RISC) architecture, such as the advanced RISC machine (ARM) CPU. The host computer system hardware 204 may also include memory and storage devices. The memory may include volatile memory, such as random access memory (RAM), static random access memory (SRAM) or dynamic random access memory (DRAM). Further, the memory may include non-volatile memory, such as flash memory, read-only memory (ROM) or electrically erasable programmable read-only memory (EEPROM). The storage may be provided by a hard disk drive or an optical storage device, among others. The storage may be local to the host computer system 202 or may be remote and accessible by the host computer system 202 over a network.

The host computer system 202 may also be equipped with one or more network adapters. A network adapter may enable the host computer system 202 to communicate over a network with other computer systems or storage devices, among others. The network adapter may enable communication over any type of protocol including, but not limited to, a local area network (LAN) communication protocol, such as Ethernet, a wireless local area network (WLAN) communications protocol such as an Institute for Electrical and Electronics Engineers (IEEE) 802.11, 802.16 or 802.21 communication protocol, short range communications protocol, or cellular wireless communications protocol, among others.

The host computer system 202 is equipped with a hypervisor 206 that is operable to manage the execution of a guest operating system on the instantiated computer system 208. The hypervisor 206 may be a computer system program, process, service, application, module, operating system entity, controlling domain, communication node or collection of these or other computer system entities. The hypervisor 206 may instantiate the instantiated computer system 208 by presenting a guest operating system to the instantiated computer system 208. Further, the hypervisor 206 may cause the instantiated computer system 208 to be removed from operations or "torn down", for example, based at least in part on receiving a request. The computing resources allocated to the instantiated computer system 208 may then be reallocated to another computer system or reserved for future use. It is noted that although a hypervisor 206 is described with reference to FIG. 2, any virtualization layer entity may alternatively be used.

The instantiated computer system 208 has an associated kernel 210. The kernel 210 may be a computer system program, process, module or operating system entity, among others that manages requests received from programs or applications that are executing or running on the instantiated computer system 208. The requests (for example, system calls) may pertain to operations that are sought to be performed by a computer system program, whereby the kernel 210 may translate the requests into data processing instructions that may be provided to the underlying computing resources of the instantiated computer system 208 for execution.

The kernel 210 has an associated kernel data structure 212. It is noted that although one kernel data structure 212 is shown in FIG. 2, it is understood that the kernel 210 may have an associated a plurality of data structures. A kernel data structure 212 may be any type of data that is retained by the kernel 210 of the computer system 208. For example, the kernel data structure 212 may include information about a running state of the instantiated computer system 208 and may be modified to reflect a state of an operating system. If, for example, an application is launched or a user logs onto the computer system 208, a data structure may be created to represent the new process or link the data structure to other data structures in the system. Further, the data structure 212 may include pointers to memory addresses, memory addresses of other data structures or memory addresses of routines. The data structure 212 may be stored in physical memory and may be intended to be accessible only by the kernel 210 or associated subsystems.

Attacks targeting the kernel data structure 212 may jeopardize the secure operation of the computer system 208. For example, the kernel data structure 212 may be modified to create a backdoor entryway to the computer system 208 or cause an installed firewall wall to cease operation in order to facilitate data exfiltration from the computer system 208, among others. The attacks may enable an attacker to take control of the computer system 208. Furthermore, attacks targeting the kernel data structure 212 may be undetected by applications running on the computer system 208. For example, if the computer system 208 has an application that is configured to detect attacks against the computer system 208, attacks against the kernel may be below the level at which the application is able to detect.

As shown in FIG. 2, the kernel data structure 212 may have one or more associated data fields. A field may be one or more bits of the data of the kernel data structure 212, whereby for some data structure 212, the field may be permitted to have varying values, whereas for other data structures 212, the value associated with the field may not be permitted to change under ordinary operating conditions or unless certain conditions are met. An attack on the kernel data structure 212 may attempt to cause a value of a field to change, for example, to control or change the operation of the computer system 208.

The kernel 210 also has an associated application code 214. The application code 214 may be executable instructions of the kernel 210 and may be retained in a protected area in memory. The application code 214 may be used to execute processes or handling interrupts in kernel space as opposed to a user space. The application code 214 of the kernel 210 may be used for memory management, process management, file management or input/output (110) management, among others. For example, the application code 214 may ensure that processes (for example, running instances of a program) may obtain execution resources or processing power and that the processes do not overwrite one another's areas in memory. The application code 214 may be used to execute a scheduler, a supervisor, an interrupt handler or a memory manager, among others.

The application code 214 has an associated entry point 218. The entry point 218 may be specified by the kernel 210 and may mark the beginning or initialization of execution of routines. For example, an interrupt handler routine or another routine of the kernel 210 may begin it execution at the entry point 218. The entry point 218 may also be associated with one or more instructions 216 (denoted as instruction 1 and instruction 2 in FIG. 2 and singularly referred to herein as instruction 216). The instructions 216, when executed, may access the data structure and cause the data structure 212 to be modified as described herein.

Figure 3:
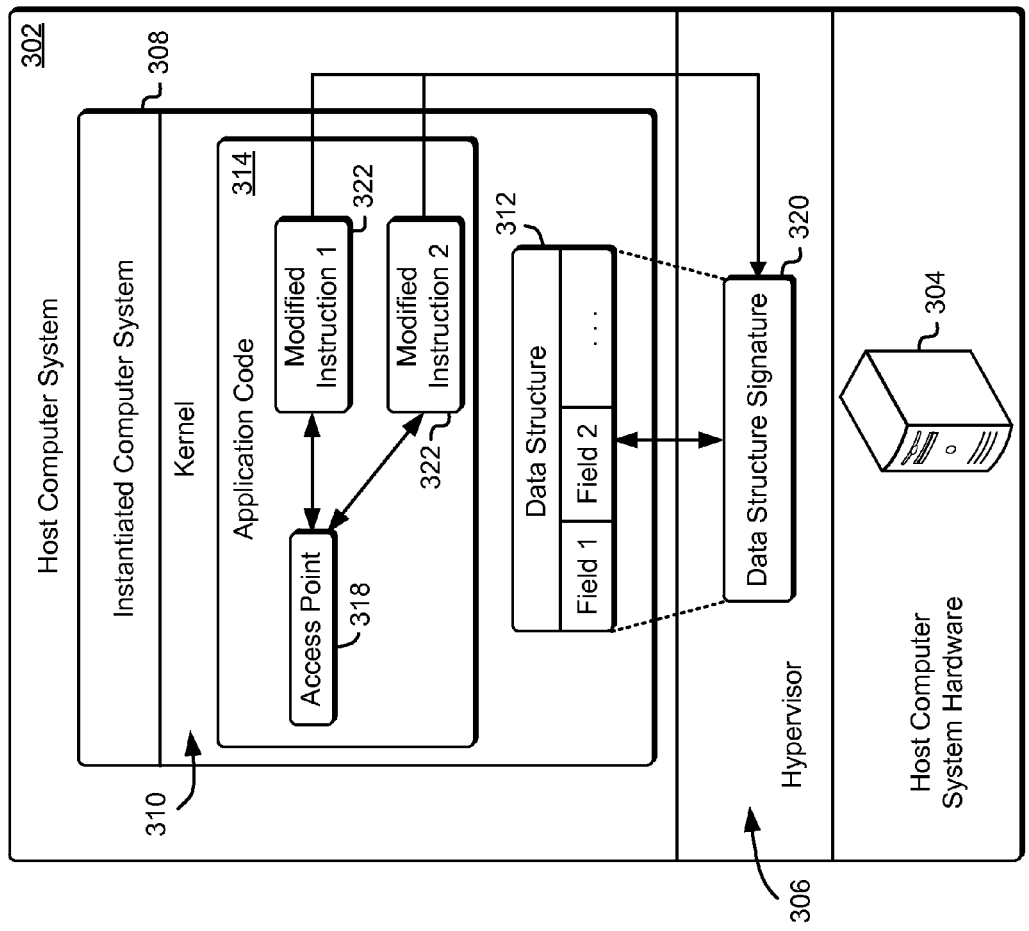
FIG. 3 shows an example of a host computer system having an instantiated computer system in accordance with at least one embodiment.

FIG. 3 shows an example of a host computer system having an instantiated computer system in accordance with at least one embodiment. The host computer system 302 is similar to the host computer system described with reference to numeral 202 in FIG. 2. The data structure 312 of the kernel 310 may be identified by the hypervisor 306. The identification of the data structure 312 may be performed as described in co-pending U.S. patent application Ser. No. 14/469,390, filed concurrently herewith, entitled "IDENTIFYING KERNEL DATA STRUCTURES" and co-pending U.S. patent application Ser. No. 14/469,200, filed concurrently herewith, entitled "IDENTIFYING TAMPER-RESISTANT CHARACTERISTICS FOR KERNEL DATA STRUCTURES", which are incorporated by reference herein. Static or dynamic code analysis may be used to identify to improve the security of the kernel 310. For example, the executable instructions of the kernel may be used to construct a pointer reachability graph specifying a layout map of the data structure 312 in memory. The layout map may further be usable to identify one or more access points 318 associated with the kernel data structure 312. As described herein, an access point 318 may be used by the instructions described with reference to numeral 216 to modify the kernel data structure 312. Relative offsets for sources, targets or edges may be used to identify one or more kernel data structures 312. Further, the tamper resistance characteristics of the data structure or associated fields may be identified. For example, the data structure 312 may or may not be tamper-resistant. In addition, whether one or more fields of the data structure 312 may be characterized as tamper-resistant may depend on one or more other fields of the data structure 312 or their associated values.

Following the identification of the data structure 312, the hypervisor 306 may generate a data structure signature 320 based at least in part on the data structure 312. The data structure signature 320 may be a copy of the data structure 312 or one or more fields thereof, whereby a field may be one or more bits of the data structure. In addition, to reduce the size of memory required to store the data structure signature 320, the data structure signature 320 may be a function of the data structure 312 or associated field. For example, the data structure signature 320 may be a hash of the data structure 312 or associated field. Further, the function may be a cyclic redundancy check (CRC), checksum or parity bit, among others. The data structure signature 320 may be usable identify whether the data structures 312 or associated field was modified, whereby an violation of an invariant condition of an expected signature and a retained data structure signature 320 may signify that the data structure 312 to which the data structure signature 320 pertains was modified or tampered with. The data structure signature 320 may be stored in a memory space allocated to or associated with the hypervisor 306. For facilitate description, the term "data structure" as used herein may refer to either a data structure comprising a plurality of fields or one or more fields of the data structure.

Upon generating the data structure signature 320, the hypervisor 306 may modify the instructions described with reference to numeral 216 to produce one or more modified instructions 322. As compared with the instructions 216, the modified instructions 322 may be configured, such that, when executed, the hypervisor 306 performs access to the data structure 312 in accordance with the instructions. An execution trap, exception, fault, abort or interrupt may be used to modify the instructions 216. An execution trap may be a transfer of control to a special handler routine or a specialized subroutine call. The execution trap may be unconditional, whereby, upon execution, control may always be transferred to a procedure associated with the trap, which may be executed by the hypervisor 306 or another entity. Upon configuring the modified instructions 322 with the execution trap, a trap handling routine or procedure of the hypervisor 306 may be used for access to the data structure 312 in accordance with the modified instructions 322.

The instructions 216, when executed, may cause one or more operations to be performed on the data structure 312. For example, data may be read from or written to the data structure 312 due at least in part to the instructions 216 being invoked. The produced modified instructions 322 (which may be binary instructions) may include a hypercall or an indirect jump to the hypervisor that causes the hypervisor 306 or an associated entity to perform the one or more operations on the data structure 312. Before or after generating the data structure signature 320, the hypervisor 306 may perform the one or more operations on the data structure 312 in accordance with the modified instructions 322 and may modify or update the data structure 312 at its associated memory location in accordance with the performed one or more operations. The hypervisor 306 may also update the data structure signature 320 to capture the modified or updated data structure 312. For example, if the one or more operations caused the data structure 312 or associated field to change in representation or value, a data structure signature 320 may be regenerated based at least in part on the changed data structure 312.

As described herein, a retained data structure signature 320 is usable to determine whether the data structure 312 has been modified in an illegitimate or unauthorized manner. Accordingly, if another instruction (not shown) that is different from the modified instructions 322 caused the data structure 312 to be modified, an invariant condition between the retained data structure signature 320 and a signature of the data structure 312 as modified may be violated. The detected violation may be used an indicator, signal or alarm that an undetected or unidentified instruction caused the data structure 312 to be modified.

Figure 4:
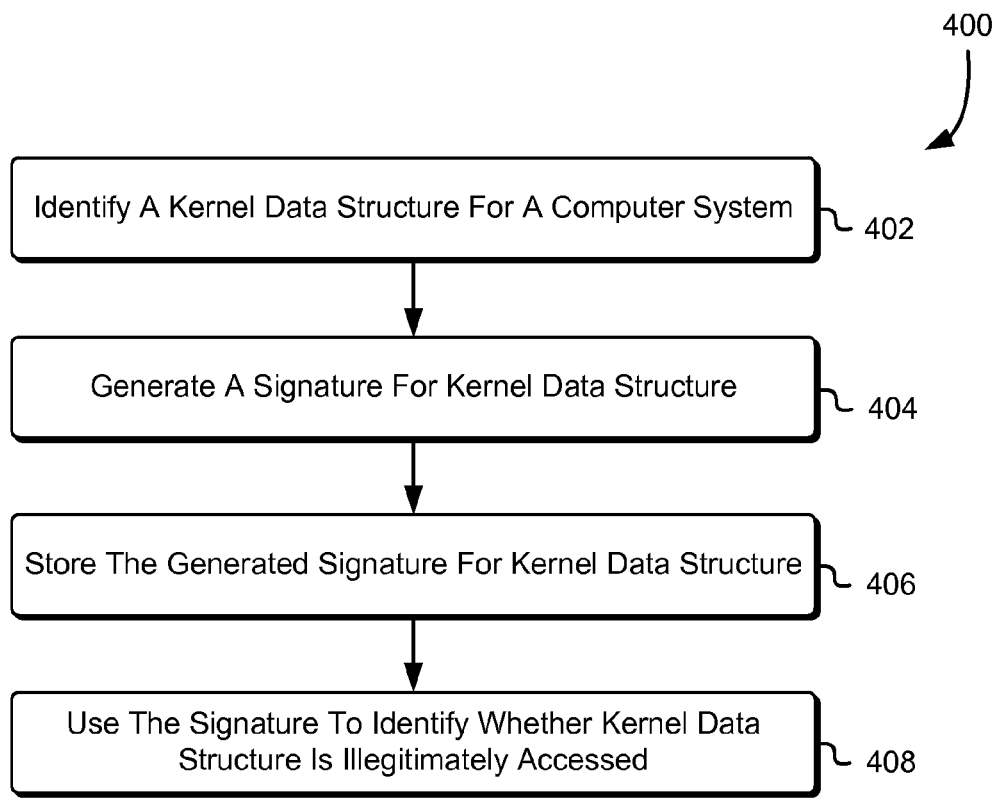
FIG. 4 shows an example of a method for kernel data structure protection in accordance with at least one embodiment.

FIG. 4 shows an example of a method for kernel data structure protection in accordance with at least one embodiment. In the process 400, a hypervisor, such as the hypervisor described with reference to numeral 306 in FIG. 3, or another computing entity identifies 402 a kernel data structure for a computer system. The kernel data structure may be capable of taking on a plurality of different values and, accordingly, the kernel data structure may be subject to attacks that may attempt to modify, overwrite or tamper with the kernel data structure in order to control the operation of the computer system or exploit the computer system. The kernel data structure may be identified as described in co-pending U.S. patent application Ser. No. 14/469,390 entitled "IDENTIFYING KERNEL DATA STRUCTURES". Further, tampering characteristics of the data structure may be identified as described in co-pending U.S. patent application Ser. No. 14/469,200 entitled "IDENTIFYING TAMPER-RESISTANT CHARACTERISTICS FOR KERNEL DATA STRUCTURES". In some embodiments, the identifying the kernel data structure may include identifying fields of the kernel data structure that are not tamper-resistant. The non-tamper-resistant kernel data structure may be sought to be protected as exploitation of the field may not trigger noticeable changes in operation of the computer that would signify tampering. For example, modification of a tamper-resistant kernel data structure may cause the computer system to cease operation or "crash", whereas modification of a non-tamper-resistant kernel data structure may make the computer system exploitable while the computer system continues to perform its operations as configured or the operations for which the computer system was launched to perform. The kernel data structure may have an associated memory address. The memory address may be in the kernel space and may signify a location in the kernel space at which the kernel data structure is stored. The kernel space may be a region of the computer system's memory reserved for storing data associated with the kernel. For example, the kernel space may store kernel data structures as well as executable instructions of the kernel that may be written in machine or assembly language or code.

The hypervisor then generates 404 a signature for the kernel data structure. The signature may be any one of or a combination of the kernel data structure itself, an output of a hash function applied to the kernel data structure, a parity bit or bits of the kernel data structure or an output of a cyclic redundancy check function performed on the kernel data structure, among others. Any type of validation, error detection or error correction technique may be used to generate the signature. The signature may be retained for detecting whether changes are made to the kernel data structure. For example, if the kernel data structure is modified as a result of tampering, there is a likelihood that the retained signature will no longer correspond to the modified kernel data structure. A lack of correspondence be detected by generating a signature for the modified kernel data structure and comparing the generated signature with the retained signature, whereby if the signatures do not match, it may be concluded that the kernel data structure has been modified subsequent to the generation of the retained signature. The likelihood of detecting violation of an invariant condition between the signatures is dependent upon the type of technique or function used to obtain the signatures and whether the technique or function permits collisions between kernel data structure. As may be recognized a collision between the two kernel data structures may occur when two different kernel data structures have the same signatures. The potential for the occurrence of collisions results in certain modifications of the kernel data structure going undetected. Signature generation techniques may be used to ensure that false positives do not occur. It is noted that to reduce memory space used for storing the signature and to ensure that signature generation or the verification of kernel data structures is performed in a computationally efficient manner, the signature may be sought to have a relatively small size (as measured in bits or bytes) when compared to the size of the kernel data structure. It is recognized that increasing the size of the signature, while reducing or eliminating the likelihood of collisions, results in the need for additional storage for retaining the signature and computational resources for performing signature validation.

The hypervisor then stores 406 the generated signature for the kernel data structure. The signature may be stored in a memory space associated with the hypervisor. The hypervisor also uses 408 the signature to identify whether kernel data structure is illegitimately accessed. As described herein, the kernel data structure may be evaluated at different times to determine whether the kernel data structure corresponds to the signature, whereby a lack of correspondence may be indicative of tampering of the kernel data structure.

Figure 5:
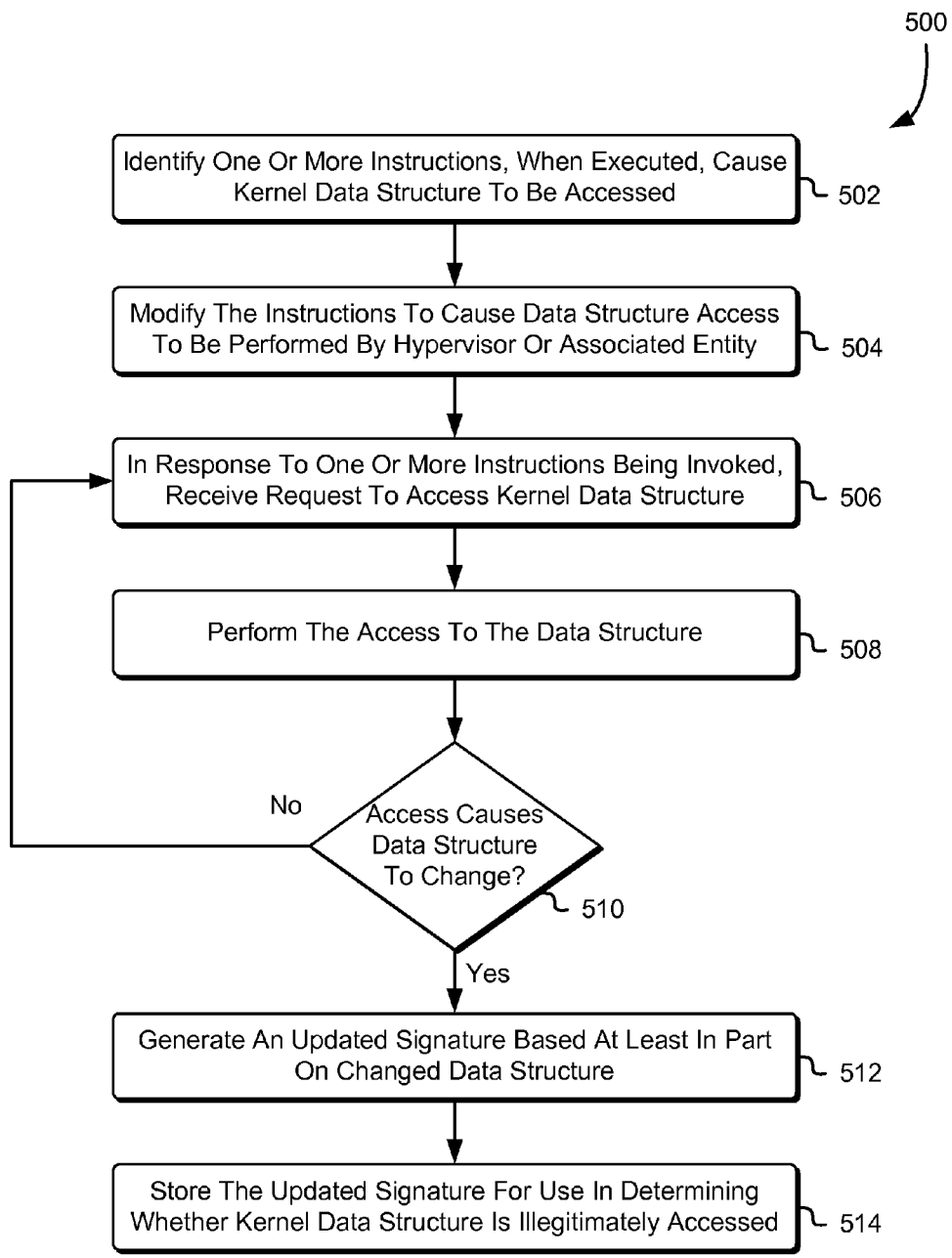
FIG. 5 shows an example of a method for updating a kernel data structure signature in accordance with at least one embodiment.

FIG. 5 shows an example of a method for updating a kernel data structure signature in accordance with at least one embodiment. In the process 500, a hypervisor, such as the hypervisor described with reference to numeral 306 in FIG. 3, or another computing entity identifies 502 one or more instructions, that when executed, cause a kernel data structure of a computer system to be accessed. The one or more instructions may be machine language or assembly language instructions or code of the kernel of an operating system of the computer system. The one or more instructions facilitate operation of the computer system and computer programs running on the computer system. The one or more instructions manage input/output requests from the computer programs and translate the input/output requests into data processing instructions for lower layer entities or components. As described in co-pending U.S. patent application Ser. No. 14/469,390 entitled "IDENTIFYING KERNEL DATA STRUCTURES", a reachability graph may constructed for the kernel data structure accessed by the one or more instructions. The reachability graph may identify one or more access points (also referred to as entry points) of the kernel code that may be used by the one or more instructions to access the kernel data structure.

The hypervisor modifies 504 the one or more instructions to cause data structure access to be performed by the hypervisor or associated entity. Accordingly, the one or more instructions may not access the data structure directly or modify the data structure without the access or modification being tracked or facilitated by the hypervisor. Access or modification of the data structure is instead performed by the hypervisor or associated entity. The one or more instructions may be configured or "patched" with a hypercall or an indirect jump to the hypervisor. Further, an assembly language-based execution trap, exception, fault, abort or interrupt may be used to modify the one or more instructions and cause access to the data structure to be performed by the hypervisor upon calling the one or more instructions.

The hypervisor receives 506 a request to access the data structure in response to the one or more instructions being invoked. For example, as a result of the one or more instructions being invoked, a hypercall is made to the hypervisor to perform access to the data structure in accordance with the one or more instructions. The hypervisor performs 508 the access to the data structure, whereby access to the data structure may entail causing the data structure to be overwritten and modified as dictated by the one or more instructions. Further, in certain circumstances, the one or more instructions may only read the data and, thus, access to the data structure may not entail changing or rewriting the data structure. Access to the data structure may include performing one or more actions on the data structure.

The hypervisor determines 510 whether the access to the data structure caused the data structure to change. For example, the hypervisor may determine whether the data structure changed in value. The change to the data structure may be a result of a modification made to the data structure due at least in part to the one or more instructions being called. The change may affect the operation of the computer system, operating system or applications running on the computer system. If a negative determination is made, the hypervisor may not make a change to a signature of the data structure that is stored by the hypervisor. Further, the hypervisor may continue to receive requests for access to the data structure based at least in part on the one or more instructions being called.

If, on the other hand, a positive determination is made, the hypervisor generates 512 an updated signature based at least in part on the changed data structure. As may be recognized, the updated signature may be generated in accordance with the algorithm or technique selected for data structure generation. The updated signature may be generated to ensure that the hypervisor has access to the signature of the latest iterations of the data structure. The updated signature may be usable to identify whether the data structure has been modified due at least in part to one or more other instructions being executed, whereby the one or more other instructions are outside of the purview of the hypervisor. For example, the one or more other instructions may not have been identified as described with reference to numeral 502 and may not have been modified to perform access to the data structure via the hypervisor.

The hypervisor then stores 514 the updated signature for use in determining whether kernel data structure is illegitimately accessed. As described with reference to FIG. 6 herein, the signature may be used to identify whether the kernel data structure was accessed by based at least in part on an instruction was not among the one or more instructions identified with reference to numeral 502. The access may be due at least in part to an attack or an attempt to control the operation of the kernel. Further, the access may be legitimate but may be interpreted to be potentially illegitimate if, for example, a process of identifying the one or more instructions is not comprehensive. For example, the process may not identify all the instructions legitimately accessing the kernel data structure. Accordingly, access by an unidentified instruction may be categorized at being potentially illegitimate. It is noted that a hypervisor may be implemented as executable instructions (such as a computer system code or an application). As described herein, a hypervisor may be implemented as computer system code or executable instructions. Accordingly, actions or operations described as being performed by the hypervisor, application or operating system among other may be performed by an underlying host computer system performing the actions or operations in accordance with the computer system code or executable instructions.

Modifying or patching the one or more instructions to cause kernel data structure access to be performed by the hypervisor or associated entity may include configuring the instructions with an indirect jump to the hypervisor as described herein. The modification to the instructions may be visible to an operating system of the computer system or an entity thereof. For example, an entity associated with a privileged hierarchical protection domain or protection ring, such as ring 0, may detect the modification to the instruction and may, accordingly, reverse or avoid the kernel data structure tamper detection and protection techniques described herein.

Alternatively, the modifications to the one or more instruction may be made at the hypervisor level for an instantiated computer system and may not be detectable or visible by the operating system or an associated entity. For example, the hypervisor may retain metadata associated with an entry point or, generally, instructions of a guest operating system. Further, the hypervisor may monitor the execution of the operating system. When the entry point is reached or an instruction pointer is modified, the hypervisor may execute additional instructions stored by the hypervisor. The instructions may generate or update a kernel data structure signature or check if the signature matches the kernel data structure. Accordingly, the operation of the operating system may not be interfered with, for example, in the event that the operating system implement a checksum-based or party bit-based tampering detection for operating system files, and the modification of the one or more instructions affects the calculated checksum or parity bit.

Figure 6:
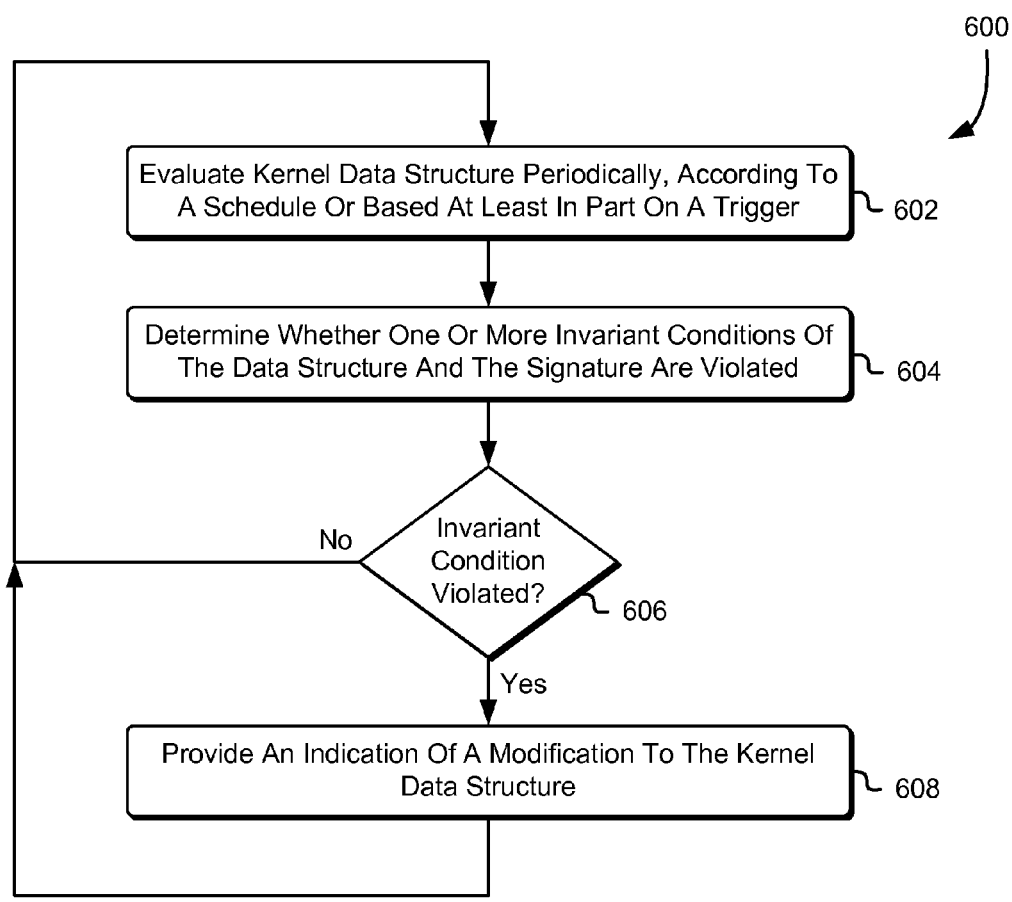
FIG. 6 shows an example of a method for detecting changes to a kernel data structure in accordance with at least one embodiment.

FIG. 6 shows an example of a method for detecting changes to a kernel data structure in accordance with at least one embodiment. In the process 600, a hypervisor, such as the hypervisor described with reference to numeral 306 in FIG. 3, or another computing entity evaluates 602 a kernel data structure periodically, according to a schedule or based at least in part on the occurrence of a trigger, whereby the trigger may be access (such as a read or a write) to the kernel data structure due at least in part to instruction execution. The kernel data structure may be a kernel data structure for which the hypervisor has an associated signature. The evaluating may include generating a signature for the data structure to be used for determining whether the data structure corresponds to a signature for the data structure that is maintained by the hypervisor. The evaluation may be performed periodically every specified time period or according to an irregular time schedule. Additionally, the evaluation may be performed based at least in part on a trigger or one or more conditions for performing the evaluation being met. For example, a score representing the likelihood that the data structure, other data structures or the computer system may be kept and may be used as indication of whether the computer system is attacked or being illegitimately used. If the score is within a specified range, evaluation of the data structure may be commenced and the results of the evaluation may be used to update the score. The trigger may be predetermined and include receipt of a message requesting the evaluation to be performed. Further, the trigger may occur due to a resource condition being met, whereby, for example, the trigger may occur if a number or a type of resources associated with a computer system meets a specified condition. The trigger may also be a privileged instruction attempt. For example, if an instruction or group of instructions categorized as privileged is scheduled for execution, the evaluation may be performed to ensure that the kernel data structure is not tampered with.

The hypervisor then determines 604 whether one or more invariant conditions of the data structure and the signature are violated. If a negative determination 606 is made, the process 600 proceeds to evaluating 602 the kernel data structure periodically, according to a schedule or based at least in part on the occurrence of a trigger. If a positive determination 606 is made, the hypervisor provides 608 an indication of a modification to the data structure. The indication may be an alarm and may be used for calculating a score that is indicative of whether the computer system is used for performing illegitimate or malicious activity. For example, the score may be increased based at least in part on the indication. Further, the score may be used to determine whether one or more actions may be taken, such as terminating the computer system.

The indication may trigger increasing the frequency at which the data structure or other data structures are inspected for identifying potential invariance. Further, the indication may also trigger restricting an amount of network access or other access to the computer system. In some embodiments, access to the computer system may be terminated but the computer system may remain to be monitored in a running state to determine whether unusual or suspicious activity is detected.

Figure 7:
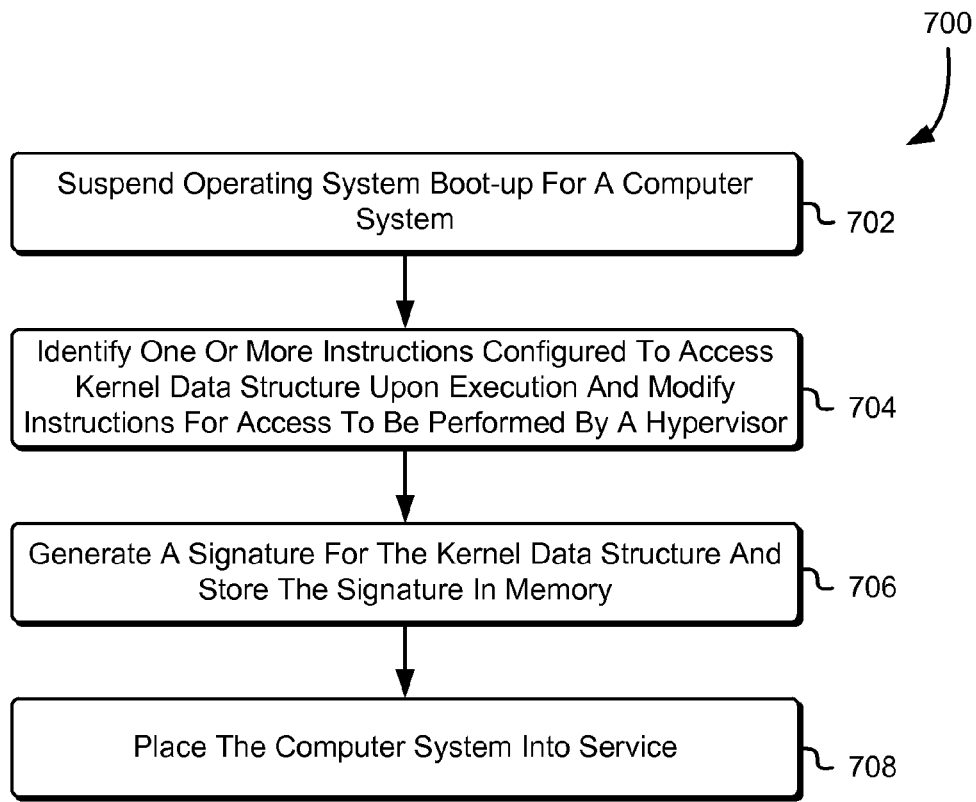
FIG. 7 shows an example of a method for kernel data structure protection in accordance with at least on embodiment.

FIG. 7 shows an example of a method for kernel data structure protection in accordance with at least on embodiment. In the process 700, a hypervisor, such as the hypervisor described with reference to numeral 306 in FIG. 3, or another computing entity suspends 702 operating system boot-up for a computer system. The computer system may have been launched by a user for use for use as an email server or webserver, among other computing operations. As described herein, the computer system may be instantiated using a host computer system, whereby the hypervisor may facilitate launching the computer system and enabling the computer system to use the computing resources provided by the host computer system. The boot-up of the operating system of the computer system may be suspended in order for the hypervisor to initiate kernel data structure protection with minimal operational interruption. The suspension may be done while the operating system is booting-up or after the boot-up process is completed but before the computer system is provided for service. It is noted that in alternative embodiments, the computer system may be suspended while in service for the one or more instructions to be identified and for the signature of the data object to be generated as described herein. However, if the computer system is suspended while in service, service interruption may be observed.

The hypervisor then identifies 704 one or more instructions configured to access the kernel data structure upon execution and modify the one or more instructions for access to be performed by the hypervisor as described herein. Further, the hypervisor generates 706 a signature for the kernel data structure and stores the signature in memory. Following modifying the one or more instructions and generating the signature, the hypervisor places 708 the computer system into service. Following placing the computer system in to service, the one or more instructions may be invoked and hypervisor may perform access to the data structure in accordance with the one or more instructions. Furthermore, the hypervisor detects whether the data structure was modified, for example, by one or more other instructions that are different than the one or more modified instructions.

In an embodiment, modifying the one or more instructions may include modifying an image of the operating system. The image of the operating system may be a copy of a state of the operating that may be stored in memory. The image of the operating system may be used to launch a computer system. Prior to launching the computer system, the image of the operating system may be modified to cause instructions of the image to access a kernel data structure via a hypervisor. The computer system may then be launched using the modified operating system image. Accordingly, the use of the modified image obviates the need to suspend operating system boot-up in order to modify the instructions.

Figure 8:
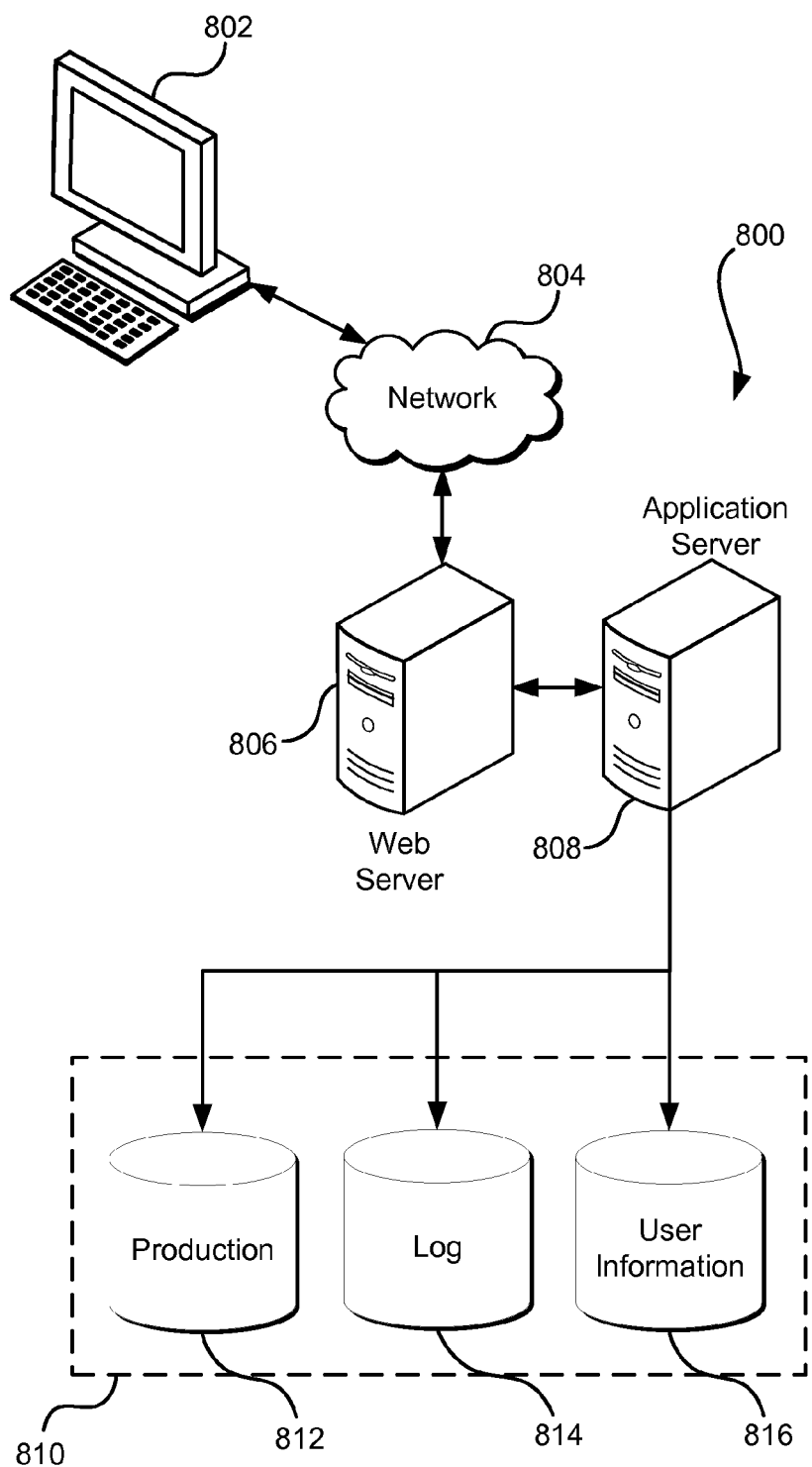
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for detecting changes to kernel data structures, comprising:
generating a signature for a kernel data structure, the kernel data structure pertaining to a kernel of an operating system of a virtual computer system instantiated on one or more computer systems, the kernel data structure comprising one or more bits modifiable due at least in part to access to the kernel data structure, the signature based at least in part on the kernel data structure;
receiving a request for the access to the kernel data structure using one or more instructions;

accessing the kernel data structure, the accessing including:
modifying the kernel data structure to produce a modified kernel data structure based at least in part on the one or more instructions;
updating the signature to produce an updated signature based at least in part on the updated kernel data structure; and
storing the updated signature; and
identifying, based at least in part on the updated signature, further access to the kernel data structure due at least in part to execution of one or more other instructions different from the one or more instructions.

2. The computer-implemented method of claim 1, wherein the access to the kernel data structure is performed by a hypervisor that instantiates the virtual computer system.

3. The computer-implemented method of claim 1, wherein generating the signature for the kernel data structure is performed by a hypervisor that instantiates the virtual computer system.

4. The computer-implemented method of claim 1, wherein modifying the one or more instructions of the kernel further includes configuring the one or more instructions with an execution trap that, upon execution of the one or more instructions, transfers control of accessing the kernel data structure to a hypervisor.

5. The computer-implemented method of claim 1, further comprising:
suspending boot-up of the operating system prior to generating the signature for the kernel data structure and modifying the one or more instructions of the kernel; and
placing the virtual computer system into service after the generating the signature and modifying the one or more instructions.

6. The computer-implemented method of claim 1, wherein modifying the one or more instructions of the kernel further includes modifying an image of the operating system of the virtual computer system prior to launching the virtual computer system.

7. A system, comprising:
one or more processors; and
memory including instructions that, when executed by the one or more processors, cause the system to provide a service configured to:
generate a signature for a kernel data structure;
determine that the kernel data structure is modified based at least in part on access to the kernel data structure, the access is due at least in part to one or more instructions being invoked;
update the signature as a result of determining that the kernel data structure is modified; and
determine, based at least in part on the signature, that the kernel data structure is accessed due at least in part to one or more other instructions being invoked.

8. The system of claim 7, wherein the instructions that cause the system to determine that the kernel data structure is accessed due at least in part to the one or more other instructions being invoked further include instructions that, when executed by the one or more processors, cause the system to:
evaluate one or more invariant conditions on the signature and the kernel data structure; and
determine that the one or more invariant conditions are violated.

9. The system of claim 8, wherein evaluating the one or more invariant conditions is performed periodically or in accordance with a schedule.

10. The system of claim 8, wherein evaluating the one or more invariant conditions is performed due at least in part to an occurrence of a predetermined trigger.

11. The system of claim 7, wherein the memory further includes instructions that, when executed by the one or more processors, cause the system to provide a service configured to provide an alarm in response to determining that the kernel data structure is accessed due at least in part to the one or more other instructions being invoked.

12. The system of claim 7, wherein the one or more instructions are modified to cause the signature to updated as a result of the access to the kernel data structure by the one or more instructions.

13. The system of claim 7, wherein the access to the kernel data structure causes one or more bits of the kernel data structure to be over-written or changed.

14. The system of claim 7, wherein:
the one or more other instructions are different from the one or more instructions; and
the one or more instructions are associated with an entry point that facilitates the access to the kernel data structure.

15. The system of claim 7, wherein a hypervisor evaluates the signature to determine that the kernel data structure is accessed due at least in part to the one or more other instructions being invoked.

16. A non-transitory computer-readable storage medium having stored thereon executable instructions that, when executed by one or more processors of a computer system, cause the computer system to at least:
store a signature for a kernel data structure;
determine a change to the kernel data structure as a result of access to the kernel data structure identified by a first entity of the computer system;
update the signature based at least in part on the determined change; and
determine, based at least in part on the signature, that the kernel data structure was changed as a result of further access to the kernel data structure by a second entity.

17. The non-transitory computer-readable storage medium of claim 16, wherein the instructions further comprise instructions that, when executed by the one or more processors, cause the computer system to generate the signature based at least in part on a function applied to the kernel data structure.

18. The non-transitory computer-readable storage medium of claim 17, wherein the function is a hash function, cyclic redundancy check function, checksum function or parity bit function.

19. The non-transitory computer-readable storage medium of claim 16, wherein the instructions further comprise instructions that, when executed by the one or more processors, cause the computer system to identify the access to the kernel data structure based at least in part on an entry point associated with executable instructions of the kernel.

20. The non-transitory computer-readable storage medium of claim 16, wherein the instructions further comprise instructions that, when executed by the one or more processors, cause the computer system to take one or more actions as a result of determining that the kernel data structure was changed as a result of the further access to the kernel data structure.

21. The non-transitory computer-readable storage medium of claim 20, wherein the instructions that cause the computer system to take the one or more actions further include instructions that cause the computer system to terminate a computing system associated with the kernel data structure.

22. The non-transitory computer-readable storage medium of claim 16, wherein the instructions further comprise instructions that, when executed by the one or more processors, cause the computer system to identify the kernel data structure based at least in part on one or more tamper-resistant characteristics of the kernel data structure.

\* \* \* \* \*